(12) United States Patent  (10) Patent No.: US 9,061,723 B2
Chen  (45) Date of Patent: Jun. 23, 2015

(54) SELF-RELEASABLE SAFETY BELT

(76) Inventor: Weng Onn Chen, Singapore (SG)

( * ) Notice: Subject to any disclaimer, the term of this patent is extended or adjusted under 35 U.S.C. 154(b) by 162 days.

(21) Appl. No.: 13/984,048

(22) PCT Filed: May 30, 2011

(86) PCT No.: PCT/SG2011/000200
§ 371 (c)(1),
(2), (4) Date: Oct. 3, 2013

(87) PCT Pub. No.: WO2012/108837
PCT Pub. Date: Aug. 16, 2012

(65) Prior Publication Data
US 2015/0115587 A1  Apr. 30, 2015

(30) Foreign Application Priority Data
Feb. 10, 2011 (SG) .............................. 201100974-3

(51) Int. Cl.
| | |
|---|---|
| *B62J 27/00* | (2006.01) |
| *B60R 22/12* | (2006.01) |
| *B60R 22/32* | (2006.01) |
| *A44B 11/26* | (2006.01) |
| *A62B 35/00* | (2006.01) |

(52) U.S. Cl.
CPC ................ *B62J 27/00* (2013.01); *B60R 22/12* (2013.01); *A44B 11/26* (2013.01); *A62B 35/00* (2013.01); *B60R 22/32* (2013.01)

(58) Field of Classification Search
CPC ...... B60R 22/12; B60R 22/32; B60R 22/322; B60R 22/324; B60R 21/10; B60R 21/22; B60R 2021/0088; B62J 27/00; A62B 35/00; A62B 35/0093; A44B 11/266
See application file for complete search history.

(56) References Cited

U.S. PATENT DOCUMENTS

| | | | |
|---|---|---|---|
| 6,793,033 B2 * | 9/2004 | Yamazaki et al. | 180/268 |
| 7,114,196 B1 * | 10/2006 | Cicio | 2/338 |
| 7,370,887 B2 * | 5/2008 | Matsuo | 280/804 |
| 8,783,722 B1 * | 7/2014 | Gallo | 280/801.1 |
| 8,925,669 B1 * | 1/2015 | Saint-Hilaire | 180/219 |

* cited by examiner

*Primary Examiner* — Paul N Dickson
*Assistant Examiner* — Timothy Wilhelm
(74) *Attorney, Agent, or Firm* — The Law Office of Austin Bonderer, PC

(57) ABSTRACT

The present invention is pertaining to a self-releasable safety belt (1) for a motorcycle or equivalent vehicles, characterized by a strap (2) including a first end and a second end, a retractor (3) receiving the first end of said strap (2) for stowing and locking the strap (2), a detachable joint (4) coupling the first end of said strap (2) to the rear of the vehicles, a male connector (7) coupled to the second end of said strap (2), a female connector (8) including a pair of releasing devices (9), a mounting device (10) coupling the female connector (8) to the rear of the vehicles, and a U-bracket (11) affixed on the mounting device (10) and having two arms (12) protruded towards the pair of releasing devices (9). The male connector (7) is ejected from the female connector (8) when the releasing devices (9) contact the arms (12) with force. Said safety belt (1) is able to hold the wearer in place, and self-releasable and detachable to disentangle the wearer when the vehicle falls from an upright position to the left or right side after an abrupt halt or impact.

9 Claims, 4 Drawing Sheets

SELF-RELEASABLE SAFETY BELT

BACKGROUND OF THE INVENTION

1. Field of the Invention

The present invention relates to a safety belt; more particularly, a motorcycle or equivalent vehicles safety belt for a rider or a passenger which is extendable and retractable, but grasp the wearer in place when the vehicles come to an hasty halt or an impact, and self-releasable and extricates the wearer when the vehicles fall from an upright position to left or right side after the hasty halt or impact.

2. Description of Related Arts

A safety belt is a protection harness designed to secure the occupant of a vehicle against dangerous movement that may result from a collision or a sudden stop. Employing a safety belt may help to reduce injuries by halting the wearer from being flung away from the vehicles after the impact or an abrupt halt.

As well known in the arts, the safety belt is widely installed in land transports, as well as other vehicles including aircrafts. The safety belt has become a necessary device for vehicles by considering its core function in protecting an occupant at the time of collision or abrupt halt. Furthermore, the operation of safety belt during the occurrence of an accident could perform a function of protecting a wearer to the maximum; therefore, reducing the injury rates and fatality.

In accordance to the increasing number of injuries and deaths due to motorcycle accidents, implementation of safety device on motorcycle has become a concern among the interest parties. Many attempts have been made in order to reduce the staggering fatality and injury rates of a motor rider or even passenger, which includes improvement on the safer highway and motor vehicle design, as revealed in the prior arts.

One of the prior arts is disclosed in U.S. Pat. No. 7,114,196 B1, a vehicle safety belt weight stabilization device which is used by a passenger riding on a vehicle in tandem with a vehicle operator. Passenger is allowed to securely grasp one or two handgrips attached to a belt worn around the operator's waist. This invention enables the passenger to better maintain and stabilize their balance, thereby, preventing possible accidents or injury. However, the safety belt stabilization device is only applicable for the passenger. In addition, said device requires bare hand holding of the passenger on the operator which poses possibility of being thrown away in case of collision happens.

In U.S. Pat. No. 4,359,129, a safety-release back rest rig assembly has been introduced for a motorcycle or equivalent vehicles. The safety-release back rest rig assembly comprised of a vest-like garment to be wore by the driver, which body-retaining garment is strapped ahead of the driver in sling-like manner to the vehicle structure. Said rig assembly able to automatically disengage from the vehicle structure when the driver dismounts or uplifted off the seat. However, the structure of said invention is cumbersome and materials consuming.

Also disclosed in U.S. Pat. No. 4,028,742 is a motorcycle safety belt which includes upper and lower belt bands with coupling means associated therewith and connecting means for joining the respective belt bands together. The safety belt is adapted to be worn by a driver of the motorcycle for use by passengers riding in tandem. Apparently, the safety belt is applicable for the passenger but does not concern the rider of the motorcycle.

With the ever-increasing use of motorcycles and concerning the safety of both motorcycle riders and passengers, it is an aim of present invention to produce a simple but effective safety device that could reduce the deaths and injuries of motorcycle riders and passengers through occupant protection in case of a crash or abrupt halt.

SUMMARY OF INVENTION

It is an objective of this present invention to provide a self-releasable safety belt which is applicable for a motorcycle rider as well as for the passenger in order to reduce the fatality and injury rates after a collision or abrupt halt.

It is a further objective of this present invention to provide a self-releasable safety belt which is extendable and retractable, detachable and self-releasable.

It is also an objective of the present invention to provide a self-releasable safety belt which is able to hold the wearer in place, especially when the motorcycle comes to a sudden stop or an impact.

It is another objective of the present invention to provide a self-releasable safety belt which is able to disentangle the wearer when the motorcycle falls from an upright position to the left or right side.

It is a further objective of the present invention to provide a self-releasable safety belt that is simple but effective.

Accordingly, these objectives may be achieved by following the teachings of the present invention. The present invention relates to a self-releasable safety belt for a motorcycle or equivalent vehicles. Said self-releasable safety belt characterized by a strap defined by a finite length including a first end and a second end, a retractor receiving the first end of said strap for stowing and locking the strap in a predetermined situation, a detachable joint coupling the first end of said strap to the rear of the motorcycle or the like, a male connector coupled to the second end of said strap, a female connector including a pair of releasing devices disposed on opposite sides of said female connector for receiving the male connector, a mounting device coupling the female connector to the rear of the motorcycle or the like, and a U-bracket affixed on the mounting device and having two arms protruded towards the pair of releasing devices. The self-releasable safety belt provides double insurance to the wearer where the detachable joint will detach and the male connector will eject from the female connector when force is applied, thereby extricating the wearer. Said safety belt is extendable and retractable, but tighten up and hold the wearer in place when the motorcycle or the like comes to an abrupt halt or an impact, thereby preventing the wearer from being flung away; and whereby said safety belt is detachable and self-releasable, and disentangles the wearer when the motorcycle or the like falls from an upright position to the left or right side after the abrupt halt or impact, thereby preventing the wearer from being stuck in the motorcycle or the like which is still moving, or knocked by the fallen motorcycle or the like when the rider lost control or lost balance after an abrupt halt or impact.

BRIEF DESCRIPTION OF THE DRAWINGS

The features of the invention will be more readily understood and appreciated from the following detailed description when read in conjunction with the accompanying drawings of the preferred embodiment of the present invention, in which.

DETAILED DESCRIPTION OF THE INVENTION

Figure 1:
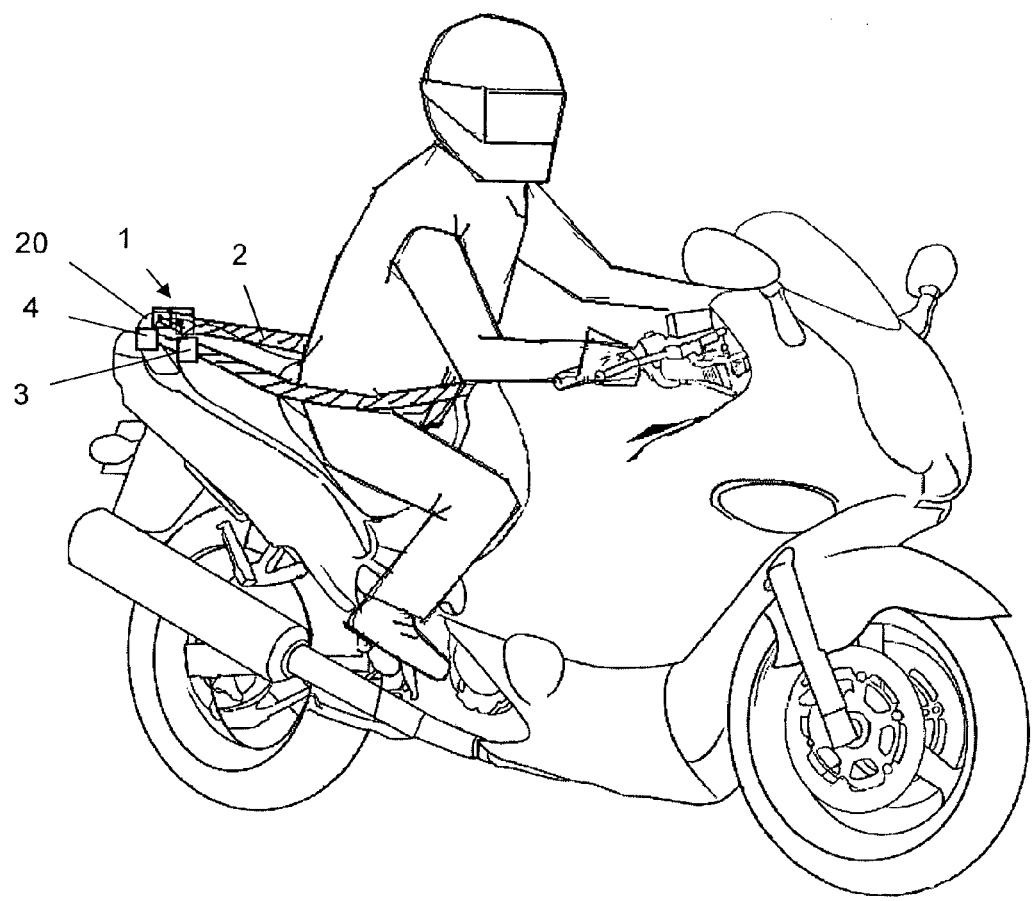
FIG. 1 illustrates the arrangement of a self-releasable safety belt utilizes in a vehicle and employs a wearer in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. As used throughout this application, the word "a" or "an" mean "at least one" and the word "plurality" means one or more, unless otherwise mentioned. Where the abbreviations of technical terms are used, these indicate the commonly accepted meanings as known in the technical field. For ease of reference, common reference numerals will be used throughout the figures when referring to the same or similar features common to the figures. The present invention will now be described with reference to FIG. 1 to FIG. 4.

The present invention relates to a self-releasable safety belt (1) for a motorcycle or equivalent vehicles. FIG. 1 shows the placement of said safety belt (1) to a motorcycle in accordance to present invention. Said safety belt (1) is designed to encircle a wearer around the waist and is fastened to the rear of the motorcycle or the like. The safety belt (1) is able to hold the wearer at the time of abrupt halt or an impact, and disentangles the wearer when the motorcycle or the like falls from an upright position to the left or right side after the abrupt halt or impact; consequently reduce the risk of fatality and injury.

Figure 2:
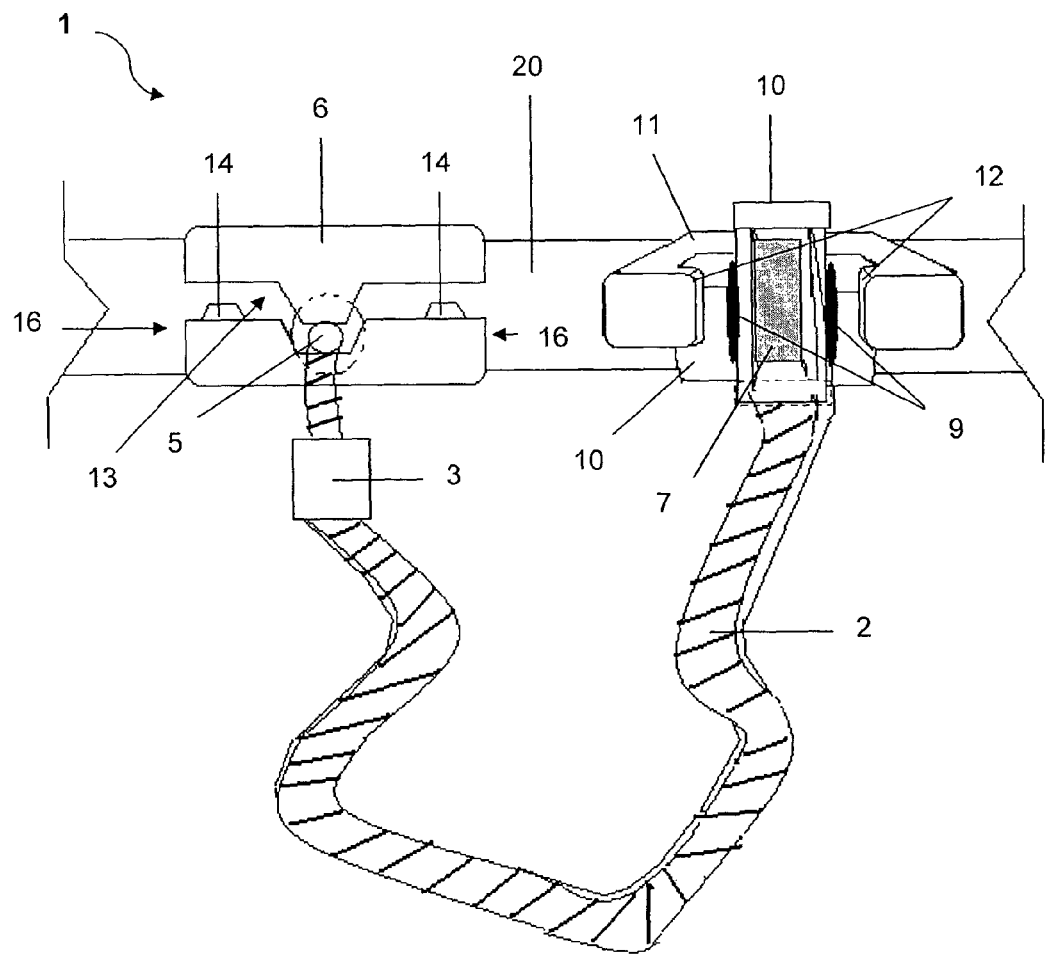
FIG. 2 is a front view of the self-releasable safety belt mounted on a U-bar at the rear of a motorcycle in accordance with the preferred embodiment.
Figure 3:
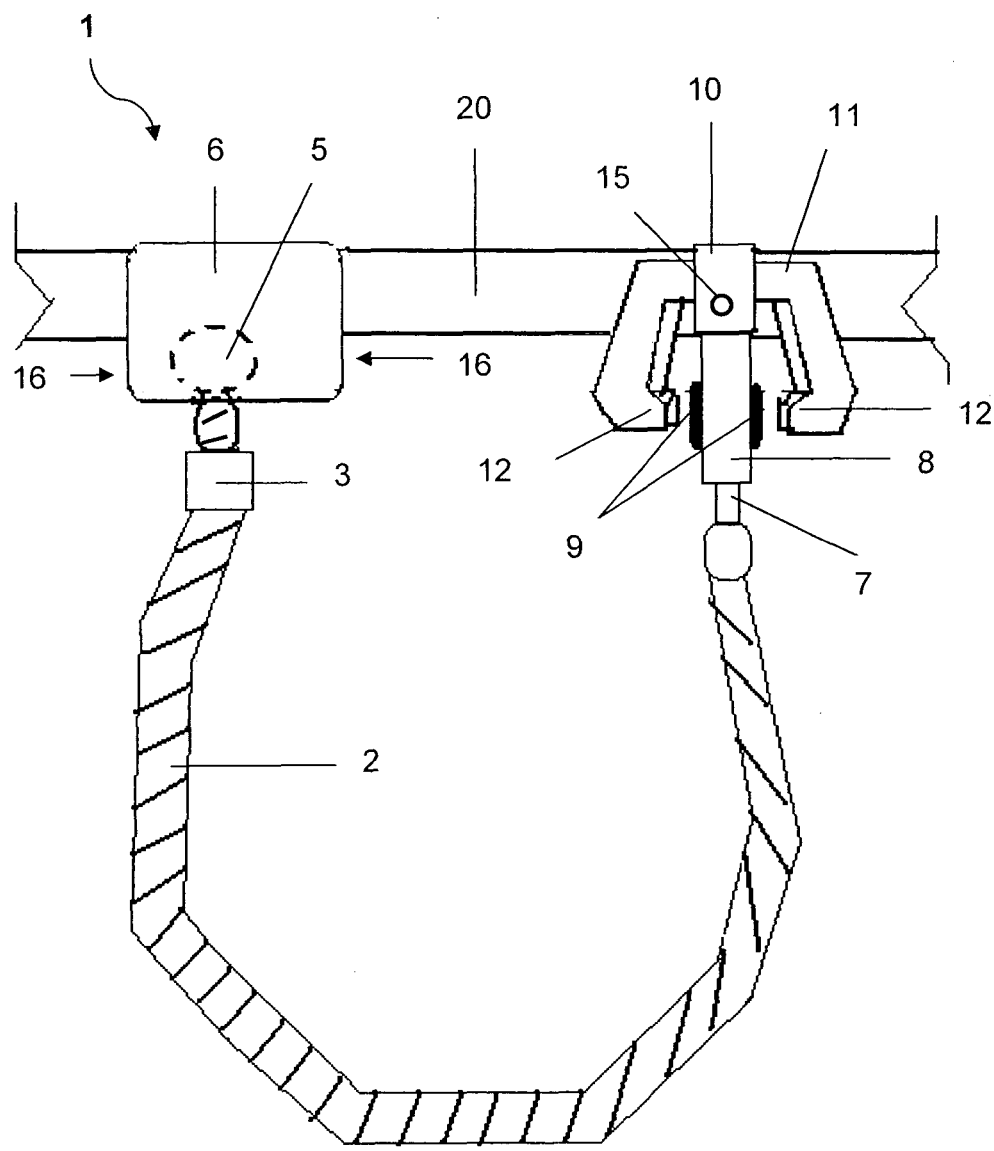
FIG. 3 is a top view of the self-releasable safety belt mounted on a U-bar at the rear of a motorcycle in accordance with the preferred embodiment.

Referring to FIG. 2, said self-releasable safety belt (1) is characterised by a strap (2), a retractor (3), a detachable joint (4), a male connector (7), a female connector (8), a mounting device (10), and a U-bracket (11). The self-releasable safety belt (1) is fastened to the rear of the motorcycle, preferably fastened to a U-bar (20) of the motorcycle. FIG. 3 shows the top view of the self-releasable safety belt (1) that is mounted to the U-bar (20).

Also referring to FIG. 2 and FIG. 3, the strap (2) of the self-releasable safety belt (1) is defined by a finite length including a first end and a second end. The strap can be made by any kind of material but preferably webbing that is light and strong, and able to extend in an accident to absorb energy.

The first end of the strap (2) is received by the retractor (3) for stowing and locking the strap (2) in a predetermined situation. The retractor (3) is preferably has an inertia reel system to resist acceleration during abrupt halt or collision, which comprises an automatic locking where it locks when the strap (2) is extracted and fastened, and unlocks when the strap (2) is fully retracted. Further, the retractor (3) which is snatch sensitive may lock when the strap (2) is snatched and consequently securing the wearer during riding and grasping the wearer when the motorcycle comes to a sudden stop or collision.

The first end of the strap (2) passes through the retractor (3) and coupled by the detachable joint (4) to the rear of the motorcycle or the like. In the preferred embodiment, the detachable joint (4) includes a shaft (5) and a socket (6), wherein the shaft (5) is coupled to the first end of said strap (2) and the socket (6) is coupled to the rear of the motorcycle or the like for receiving the shaft (5). The socket (6) is preferably a hollow cylindrical rod having two opened ends (16) for receiving the shaft (5) at both ends. The socket (6) is mounted to the U-bar (20) of the motorcycle leaving a space for receiving the shaft (5). The socket (6) includes a slit (13) to enable the shaft (5) to slide into the socket (6) and a retaining clip (14) mounted on both ends of the slit (13) to hinder the shaft (5) from sliding out from the socket (6) until a force snatches the strap (2) and detaches the shaft (5) from the socket (6). The shaft (5) is retained in the socket (6) and disengages from the socket (76) only when force is applied, thereby, provide the double insurance for releasing the strap (2) and disentangling the wearer when motorcycle or the like falling to the left or right side after an abrupt halt or collision. Furthermore, the detachable joint (4) is designed for convenience in disassembling said safety belt (1) from the motorcycle when not in use by sliding the shaft (5) from the socket (6).

Figure 4:
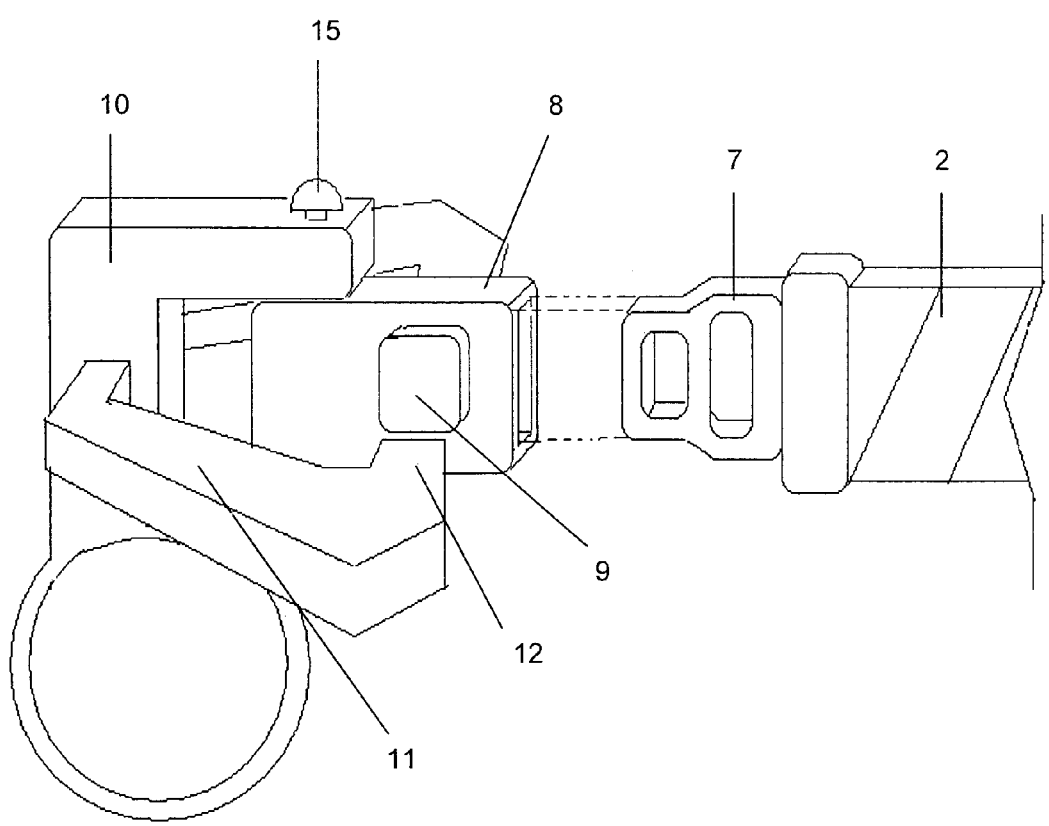
FIG. 4 is a side perspective view illustrating the engagement of a male connector to a female connector that is coupled to a mounting device by a pivot.

The second end of the strap (2) is coupled to the male connector (7), wherein the male connector (7) is received by the female connector (8), as illustrated in FIG. 4. The male connector (7) may be a tongue that is pushed into the female connector (8) when connecting the self-releasable safety belt (1) and is ejected when the male connector (7) is released. The female connector (8) may be a buckle with an anchorage hole, for receiving the male connector (7). Said female connector (8) includes a pair of releasing devices (9) disposed on opposite sides of said female connector (8). The female connector (8) is coupled to the rear of the motorcycle or the like by the mounting device (10). Preferably, the detachable joint (4) and the mounting device (10) are mounted on a U-bar (20) at the rear of a motorcycle or the like.

As seen in FIG. 4, the female connector (8) is coupled to the mounting device (10) by a pivot (15), thereby enabling the female connector (8) to swing horizontally. The U-bracket (11) is affixed on the mounting device (10), and has two arms (12) protruding towards the pair of releasing devices (9). The arms (12) are aligned with the releasing devices (9) in order that when the wearer falls from upright position to the left or right side after the abrupt halt or impact, the releasing devices (9) will contact the arms (12) with force, resulting in the ejection of the male connector (7) from the female connector (8). In the preferred embodiment, the releasing devices (9) are disposed on the left and right sides of the female connector (8). When the motorcycle or the like falls from an upright position to the left or right side, the wearer may fall to the left or right accordingly and draw the self-releasable safety belt (1). Therefore, one of the pair of releasing devices (9) will force toward one of the arms (12), causing the male connector (7) to eject from the female connector (8). As a result, the safety belt (1) is self-releasable and disentangles the wearer when the motorcycle or the like falls from an upright position to the left or right side, thus, preventing the rider or passenger from falling beneath the motorcycle or the like or being knocked by the fallen motorcycle or the like.

The self-releasable safety belt (1) is extendable and retractable, but tightens up and holds the wearer in place when the motorcycle or the like comes to an abrupt halt or an impact. But when the wearer losing control or balance, the safety belt (1) able to self release, thereby preventing the wearer from being stuck in the still moving motorcycle, and therefore reducing the risk of getting injured. The self-releasable safety belt (1) which is detachable and self-releasable provides a double insurance for disengaging the wearer where both side of the strap (2) is detachable and releasable. Therefore, in case either the releasing devices (9) are un-releasable or the detachable joint (4) is un-detachable, the other side may still function and disentangles the wearer when the releasing devices (9) contact with the arms (12) or the shaft (5) slide from the socket (6) as soon as the motorcycle or the like falls from an upright position to the left or right side after the abrupt halt or impact. Therefore, utilisation of the self-releasable safety belt (1) is able to increase the chances of survival of the rider and passenger in the event of an accident.

I claim:

1. A self-releasable safety belt (1) for a vehicle, characterised by
    a strap (2) defined by a finite length including a first end and a second end;
    a retractor (3) receiving the first end of said strap (2) for stowing and locking the strap (2) in a predetermined situation;
    a detachable joint (4) coupling the first end of said strap (2) to the rear of the vehicle, wherein the detachable joint (4) will detach when force is applied to said joint (4);
    a male connector (7) coupled to the second end of said strap (2);
    a female connector (8) including a pair of releasing devices (9) disposed on opposite sides of said female connector (8), for receiving the male connector (7);
    a mounting device (10) coupling the female connector (8) to the rear of the vehicle; and
    a U-bracket (11) affixed on the mounting device (10) and having two arms (12) protruding towards the pair of releasing devices (9), wherein, the male connector (7) is ejected from the female connector (8) when the releasing devices (9) contact the arms (12) with force;
    wherein said safety belt (1) is extendable and retractable, said safety belt tightening and holding in place when the vehicle comes to an abrupt halt or an impact, thereby preventing the wearer from being flung away; and
    wherein said safety belt (1) is self-releasable and detachable, and disentangles the wearer when the vehicle falls from an upright position to the left or right side after the abrupt halt or impact, thereby preventing the wearer from being stuck in the vehicle which is still moving or knocked by the vehicle when the rider lost control or balance after an abrupt halt or impact.

2. A self-releasable safety belt (1) for a vehicle according to claim 1, wherein the detachable joint (4) includes a shaft (5) and a socket (6), wherein the shaft (5) is coupled to the first end of said strap (2) and the socket (6) is coupled to the rear of the vehicle for receiving the shaft (5).

3. A self-releasable safety belt (1) for a vehicle according to claim 2, wherein the socket (6) of the detachable joint (4) is preferably a hollow cylindrical rod having two opened ends (16) for receiving the shaft (5).

4. A self-releasable safety belt (1) for a vehicle according to claim 2, wherein the socket (6) includes a slit (13) to enable the shaft (5) to slide into the socket (6) and a retaining clip (14) mounted on both ends of the slit (13) to hinder the shaft (5) from sliding out from the socket (6) until a force snatches the strap (2) and detaches the shaft (5) from the socket (6).

5. A self-releasable safety belt (1) for a vehicle according to claim 1, wherein the detachable joint (4) and the mounting device (10) are preferably mounted on a U-bar (20) at the rear of a vehicle.

6. A self-releasable safety belt (1) for a vehicle according to claim 1, wherein the female connector (8) is coupled to the mounting device (10) by a pivot (15), thereby enabling the female connector (8) to swing horizontally.

7. A self-releasable safety belt (1) for a vehicle according to claim 1, wherein the releasing devices (9) are disposed on the left and right side of the female connector (8).

8. A self-releasable safety belt (1) for a vehicle according to claim 1, wherein the arms (12) are aligned with the releasing devices (9) in order that when the wearer falls from upright position to the left or right side after the abrupt halt or impact, the releasing devices (9) will contact the arms (12) with force, resulting in the ejection of the male connector (7) from the female connector (8).

9. A self-releasable safety belt (1) for a vehicle according to claim 1, wherein the retractor includes an inertia reel system to resist acceleration during abrupt halt or impact.

* * * * *